(12) United States Patent
Tomita (10) Patent No.: US 8,307,559 B2
(45) Date of Patent: Nov. 13, 2012

(54) BUSH CUTTER BLADE AND BUSH CUTTER (76) Inventor: Tatsuo Tomita, Kanagawa (JP)

( * ) Notice: Subject to any disclaimer, the term of this patent is extended or adjusted under 35 U.S.C. 154(b) by 248 days.

(21) Appl. No.: 12/452,265

(22) PCT Filed: Sep. 20, 2007

(86) PCT No.: PCT/JP2007/068247
§ 371 (c)(1),
(2), (4) Date: Dec. 22, 2009

(87) PCT Pub. No.: WO2009/037767
PCT Pub. Date: Mar. 26, 2009

(65) Prior Publication Data
US 2010/0132200 A1   Jun. 3, 2010

(51) Int. Cl.
A01D 34/416 (2006.01)
A01D 34/412 (2006.01)

(52) U.S. Cl. ............... 30/276; 30/347; 56/12.7
(58) Field of Classification Search .......... 30/276, 30/347, 122; 56/12.7
See application file for complete search history.

(56) References Cited

U.S. PATENT DOCUMENTS

| 4,107,841 | A | * | 8/1978 | Rebhun | 30/276 |
| 4,202,094 | A | * | 5/1980 | Kalmar | 30/276 |
| 4,790,071 | A | * | 12/1988 | Helmig et al. | 30/276 |
| 4,905,465 | A | * | 3/1990 | Jones et al. | 56/295 |
| 5,651,418 | A | * | 7/1997 | Jerez | 172/14 |
| 5,743,019 | A | * | 4/1998 | Berfield | 30/276 |
| 5,852,876 | A | * | 12/1998 | Wang | 30/276 |
| 5,862,598 | A | * | 1/1999 | Lee | 30/276 |
| 6,298,642 | B1 | * | 10/2001 | Harb | 56/12.7 |
| 6,349,475 | B1 | * | 2/2002 | Buck | 30/276 |
| 6,442,845 | B2 | * | 9/2002 | Wheeler et al. | 30/276 |
| 7,017,272 | B2 | * | 3/2006 | Grace | 30/275.4 |
| 7,913,401 | B2 | * | 3/2011 | Iacona | 30/275.4 |
| 2005/0044725 | A1 | * | 3/2005 | Alliss | 30/276 |

FOREIGN PATENT DOCUMENTS

| JP | 4-052418 U | 5/1992 |
| JP | 52418/1992 U | 5/1992 |
| JP | 5-30599 Y2 | 8/1993 |
| JP | 7-184446 A | 7/1995 |
| JP | 8-172845 A | 7/1996 |
| JP | 10-234216 A | 9/1998 |
| JP | 11-235113 A | 8/1999 |
| JP | 2000-308407 A | 11/2000 |

* cited by examiner

Primary Examiner — Laura M. Lee
(74) Attorney, Agent, or Firm — Carrier Blackman & Associates, P.C.; Joseph P. Carrier; William D. Blackman (57) ABSTRACT A bush cutter includes two types of cutting blades which differ completely in characteristics used to cut grasses and the like. One cutting blade is a resin string blade wound around a reel installed on a base plate, and the other is a metal blade installed in such a way as to protrude outward from the base plate. The bush cutter also includes a string guide which guides the resin blade to extend outwardly at less than a 90 degree angle from the reel as it projects from the base plate.

18 Claims, 8 Drawing Sheets

BUSH CUTTER BLADE AND BUSH CUTTER

TECHNICAL FIELD

The present invention relates to a bush cutter blade used to cut weeds, grass, shrubs, and the like as well as a bush cutter equipped with the bush cutter blade, and more particularly, to a bush cutter blade which is a combination of a resin string blade and a metal blade as well as a bush cutter equipped with the bush cutter blade.

BACKGROUND ART

Existing bush cutter blades are broadly classified into resin string blades and metal blades. The specialty fields of the two types are divided distinctly with each type having its own strong points. Specifically, the resin string blades provide a high level of safety and can cut grass under almost any condition. Moreover, the resin string blades can cut grass to the very limit, producing a neat, clean cut. Also, the cut grass is reduced to chips, and thus there is no need for cleaning. In particular, the resin string blades can safely cut grass around obstacles, grass containing foreign matter, or grass in gravelly places, which is something the metal blades are not good at. However, the resin string blades have the drawback of being unable to cut hard grass or small branches, and their greatest weakness is that they take an awful lot of time and wear and tear excessively.

The metal blades have varying numbers of teeth or cutting edges, ranging from two to a few tens of teeth or cutting edges. Regarding material, the metal blades are made of steel and some metal blades have carbide-tipped teeth or cutting edges. The metal blades have the advantage of being able to cut both grass and small branches sharply, thereby providing high cutting efficiency. However, if the metal blades hit an obstacle, they can get broken or damage or break the obstacle. In this way, they involve high risks and could involve a big sacrifice. Tip saw blades and the like can get nicked in an instant and are not resharpenable. Therefore, it is uneconomical to use a tip saw blade without considering where it is used.

Thus, if the two types of grass cutting blade are combined appropriately, it will be possible to carry out a grass cutting operation in a short period of time under various conditions, but so far, there has been no appropriate combination.

The present invention has been made to solve the above problem.

Conventional grass cutting blades resulting from a combination a resin string blade and metal blade include those which involve carrying a short replacement resin string (see, for example, patent document 1 or 3) and those which use a resin blade instead of a metal blade (see, for example, patent document 2).

Patent document 1: Japanese Patent Laid-Open No. 10234216 (p. 7, FIG. 16)
Patent document 2: Japanese Patent Laid-Open No. 11-235113 (p. 7, FIG. 17)
Patent document 3: Japanese Patent Laid-Open No. 2000-308407 (p. 7, FIG. 18)

DISCLOSURE OF THE INVENTION

Problems to be Solved by the Invention

It is believed that if two types of grass cutting blades—a resin string blade and a metal blade—which differ completely in characteristics are combined appropriately, grass cutting operations can be efficiently carried out under various conditions. However, the conventional grass cutting blades described above have problems in that the resin string blade is liable to be cut at a mounting portion, that the length of the resin string blade cannot be adjusted easily, that the metal blade could cut off the resin string blade of the same bush cutter, and so on.

Also, with the type which uses a replacement resin string of a predetermined length, it is troublesome to carry and replace the string. In particular, this type produces a lot of scrap, which is uneconomical.

Consequently, there is demand for a blade which provides high grass cutting efficiency and whose resin string is not cut easily except for natural wear and tear under whatever conditions grass cutting operations may be carried out and lends itself readily to length adjustment.

Means for Solving the Problems

A bush cutter blade according to the present invention includes a base plate; a reel installed on the base plate; a resin string blade wound around the reel; a string guide which detachably secures the resin string blade to the base plate; and a metal blade installed in such a way as to protrude outward from the base plate, wherein the resin string blade is fixed to the string guide in such a way as to protrude further outward than an outermost periphery of the metal blade.

The string guides may be installed diagonally across the reel, a hook may be installed on a side wall surface of the reel, the resin string blade of a predetermined length may be folded into two strings, the two strings may be wound around the reel starting from the hook with the folded resin string blade hitched to the hook, and terminal portions of the two strings of the resin string blade may be fixed by being drawn out of the base plate in such a way as to face opposite directions.

The reel may be installed rotatably with respect to the base plate and a mechanism may be provided to lock the rotation of the reel with respect to the base plate.

Furthermore, the reel may be formed integrally with the base plate.

Furthermore, the metal blade may be mounted replaceably on the base plate.

Furthermore, the metal blade may be installed integrally with the base plate.

A bush cutter according to the present invention is equipped with the bush cutter blade which has any of the above-described features.

BEST MODE FOR CARRYING OUT THE INVENTION

A bush cutter blade according to an embodiment of the present invention will be described below with reference to the drawings.

Figure 1:
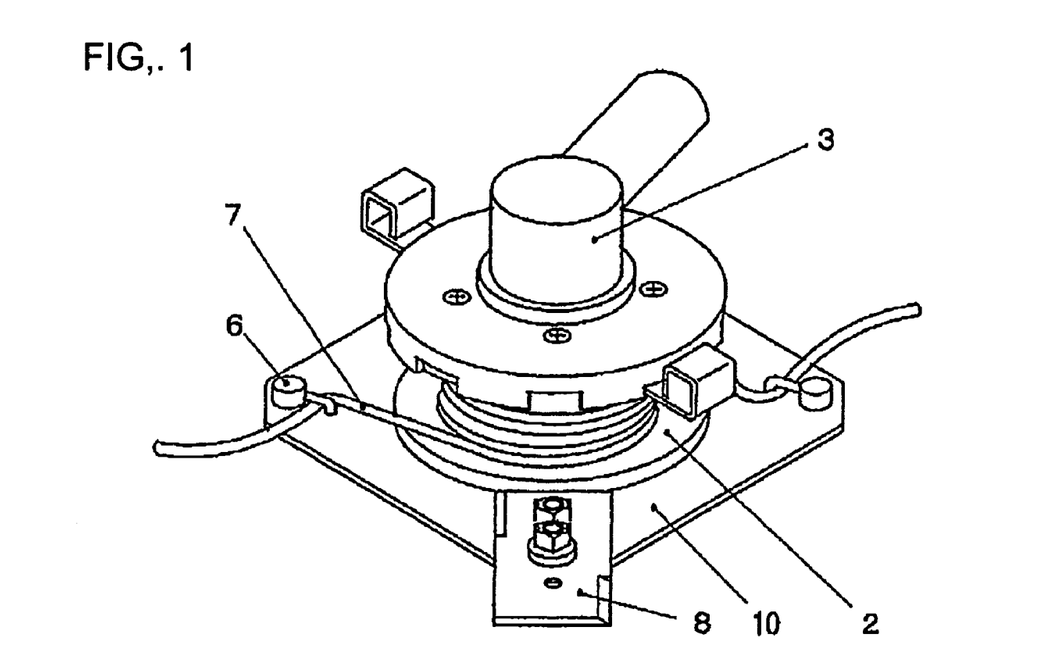
FIG. 1 is a perspective view showing a bush cutter blade according to an embodiment of the present invention.
Figure 2:
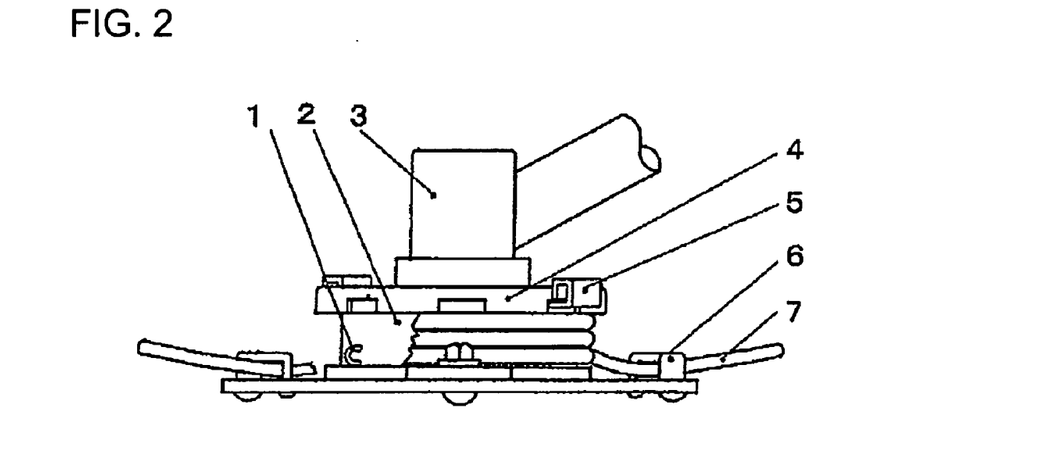
FIG. 2 is a front view showing the bush cutter blade according to the embodiment of the present invention.
Figure 3:
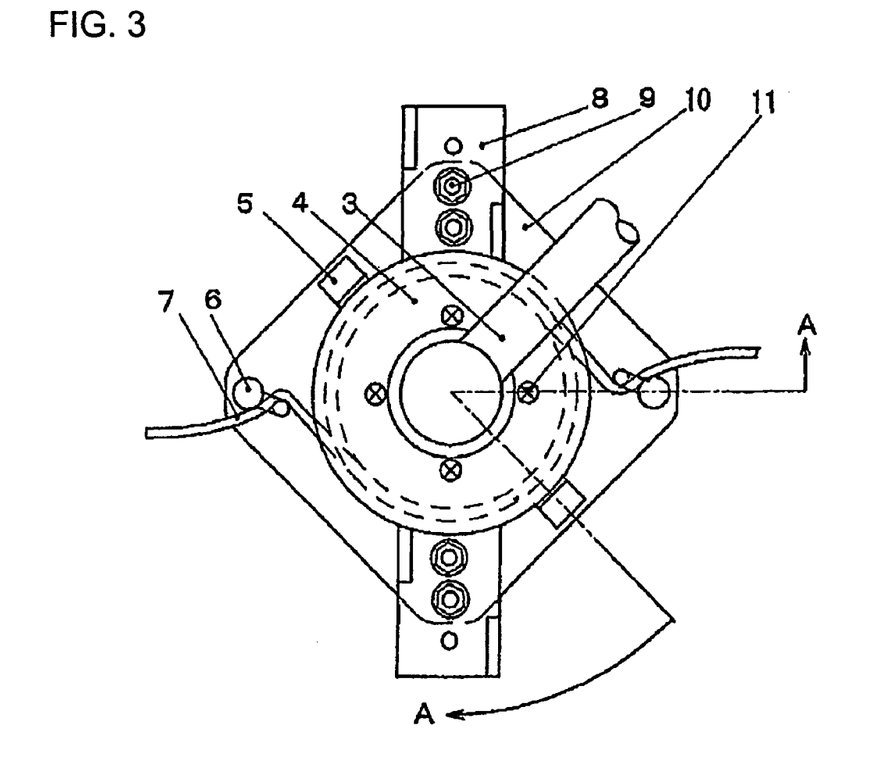
FIG. 3 is a plan view showing the bush cutter blade according to the embodiment of the present invention.
Figure 4:
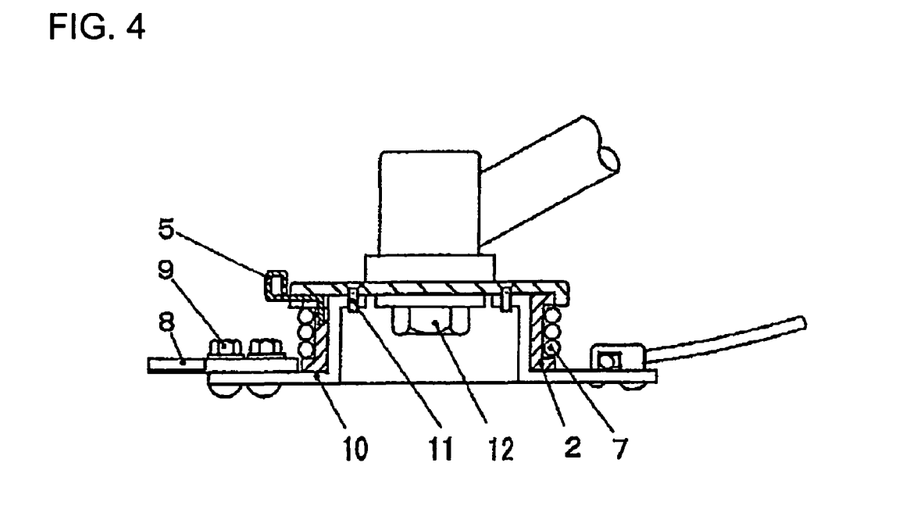
FIG. 4 is a sectional view taken along line A-A in FIG. 3.

As shown in FIGS. 1, 2, and 3, the bush cutter blade according to the embodiment of the present invention includes, in its basic structure, a base plate 10 fastened with screws to a bush cutter head 3 which is a bush cutter blade mounting shaft, a resin string blade 7 wound around a reel 2 in an extendable/retractable manner, a pair of string guides 6 which detachably secures the resin string to the base plate 10, and a pair of replaceable metal blades 8.

The reel 2 is mounted in the center of the base plate 10, being exposed to the open air, and is rotatable with respect to the base plate 10. Also, the reel 2 is equipped with a mechanism which can lock the rotation of the reel 2 at predetermined angular intervals.

Figure 6:
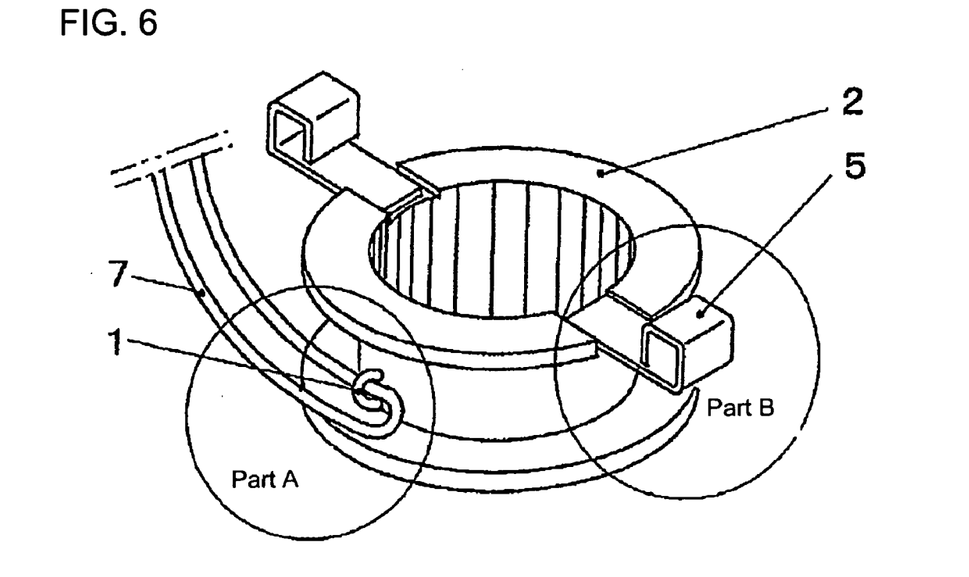
FIG. 6 is a perspective view showing a reel of the bush cutter blade according to the embodiment of the present invention.

The resin string blade 7 is wound around the reel 2 as follows. As shown in FIG. 6, a hook 1 is installed on a side wall surface of the reel 2, the resin string blade 7 of a predetermined length is folded into two strings, and the two strings are wound around the reel 2 starting from the hook with the folded resin string blade 7 hitched to the hook. Terminal portions of the two strings of the resin string blade 7 are drawn radially out of the reel 2 in such a way as to face opposite directions, being set to such a length as to protrude further outward than the outermost peripheries of the metal blades 8 and being detachably secured in the middle by string guides 6 installed on the base plate 10.

Figure 9:
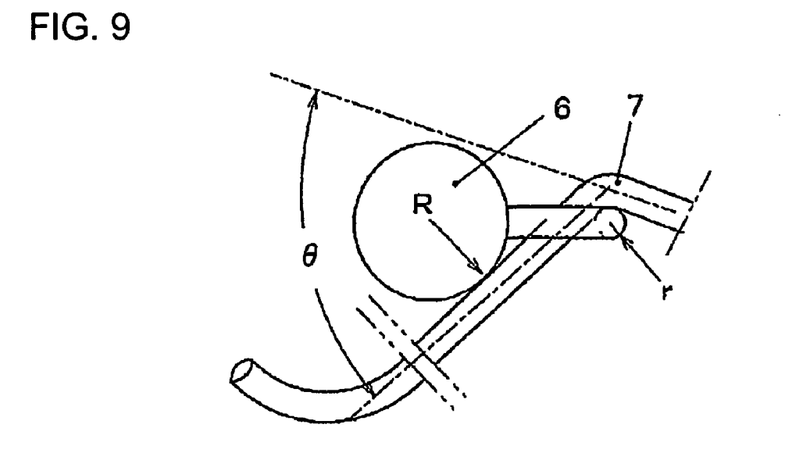
FIG. 9 is a detailed plan view of Part C in FIG. 8.

The string guides 6 are installed at two points near peripheries of the base plate 10 along a diagonal passing through the center of the base plate 10. Regarding their geometry, as is well illustrated in FIG. 9, each string guide 6 has an opening to pass the resin string blade 7 and an arc-shaped portion which comes into contact with the resin string blade 7 after the resin string blade passes through the opening. Besides, the opening and the arc-shaped portion of the string guide 6 are oriented in such a direction that the resin string blade 7 extending from the reel 2 will extend outward by being bent at an angle of less than 90 degrees instead of extending linearly outward when passed through the opening. More particularly and as shown in FIGS. 1, 3, and 9, the string guide directs constantly the resin string blade to extend outwardly at less than the 90 degree angle relative to a direction of the string blade extending substantially tangentially from the reel and toward a rotation direction of the bush cutter blade. As shown, the arc shaped portion may be substantially cylindrically shaped and fixed to the base plate 10, and the string guide may also have an L-shaped projection extending from a side surface of the arc shaped portion and fixed to the base plate such that the opening is defined between the base plate, the side surface of the arc shaped portion, and the L-shaped projection. As shown in FIG. 9, when the resin string blade passes through the opening it contacts the curved side surface of the arc shaped portion and is guided to project away from the base plate at an angle θ relative to a line extending substantially tangentially to the reel.

Two metal blades 8 are installed on peripheral edges of the base plate 10 at 90-degree angles to the string guides 6. The metal blades 8 are screwed with their cutting edges protruding outward from the base plate 10. The blades have been drilled such that they can be mounted replaceably on the base plate 10 in any of four positions by being turned over and turned around 180 degrees or in any of two positions by being turned around 180 degrees. Also, the metal blades 8 are available in two types which can be selected according to the intended use.

Two seems insufficient as the number of metal blades 8, but actually this should pose no problem. The base plate 10 is illustrated as being rectangular in shape, but may be circular in shape or thinner.

Figure 7:
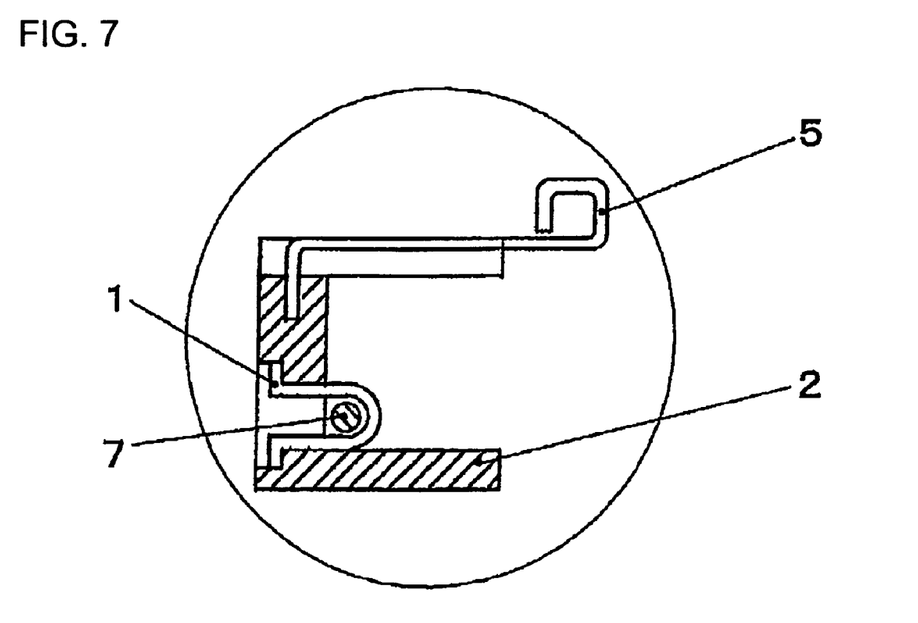
FIG. 7 is an enlarged sectional view of Parts A and B in FIG. 6.
Figure 15:
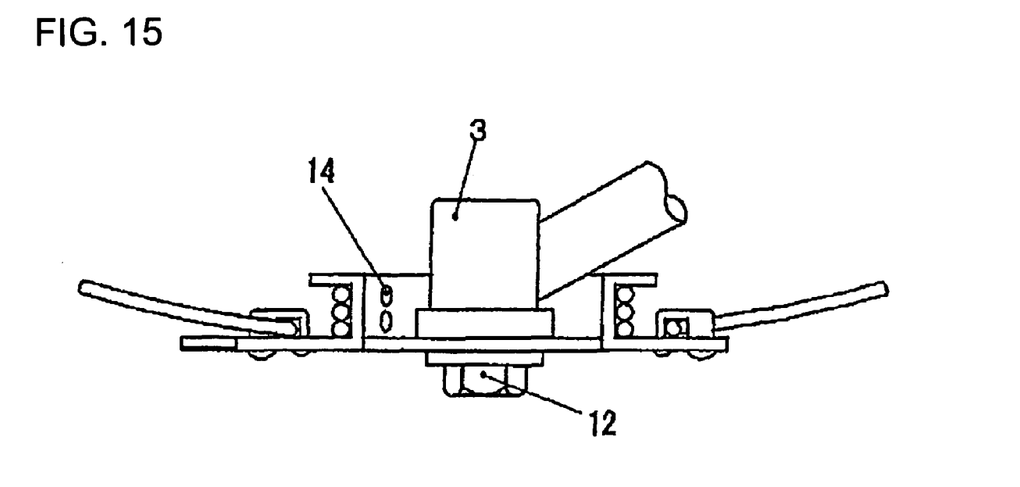
FIG. 15 is a front view, partially including a cross section, showing a mounting position for a bush cutter head of the bush cutter blade according to another embodiment of the present invention.

(a) In a first example whose geometry is represented by FIGS. 1 to 4, a lock plate 4 is provided on the face which is mounted on the bush cutter. Actually, however, a mounting method shown in FIG. 15 is also available. Also, although the lock plate 4 is illustrated as being fastened to the base plate with countersunk screws 11, the lock plate 4 may alternatively be fastened by caulking or spot welding. If the reel 2 is made of rigid resin, a lock lever 5 made of a spring material and the metal hook 1 installed on a wall surface of the reel may be implanted in the reel 2 as shown in FIG. 7. If the reel 2 is made of metal, the lock lever 5 and metal hook 1 may be attached by spot welding or the like.

The terminal portions of the strings 7 wound starting from the hook 1 are passed through the string guides 6 as shown in FIG. 1, and are preferably extended outward at an angle of θ as shown in FIG. 9. This is done not only to make it easier to pass the string, but also to prevent the elastic resin string from unwinding from the reel by tending to straighten itself up.

Figure 10:
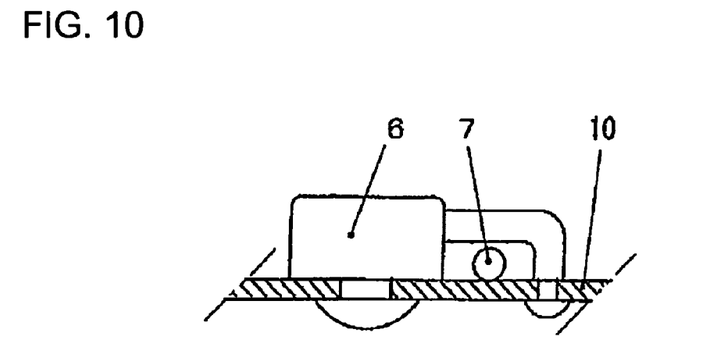
FIG. 10 is a detailed front view of Part C in FIG. 8.

To avoid overheating and thereby prevent the resin string from seizing, no cover or the like is put on the reel. As shown in FIG. 10, the string guide is joined to the base plate 10 by caulking or welding.

In FIG. 9, the string 7 comes into contact with lateral sides of cylindrical bodies. The cylindrical body hit hard by the string has a large R, but the cylindrical body hit weakly by the string may have a small r.

Figure 5:
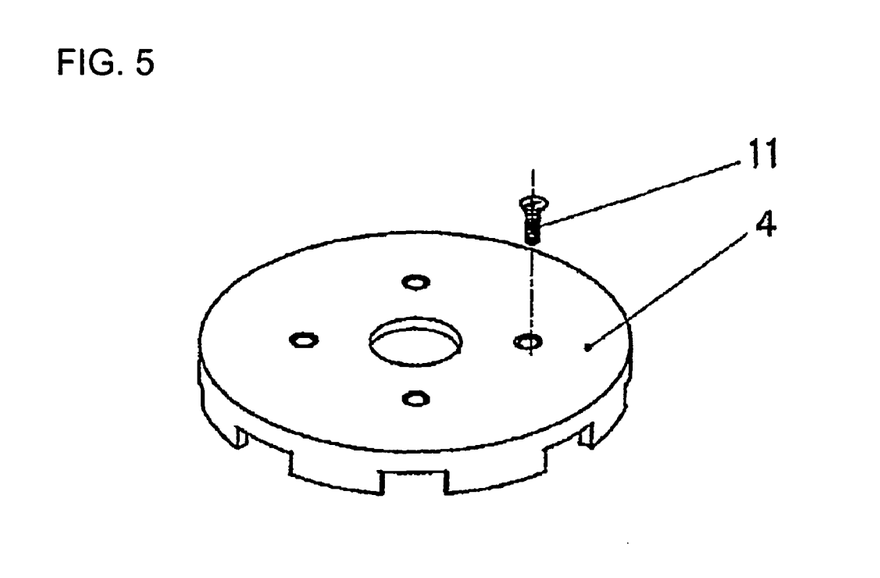
FIG. 5 is a perspective view showing a lock plate of the bush cutter blade according to the embodiment of the present invention.

As shown in FIGS. 5 and 6, after disengaging the two lock levers 5 from recesses in the lock plate 4 by pressing the lock levers 5, the protruding length of the resin string can be set freely by rotating the reel 2 left and right. Then the lock levers 5 lock themselves automatically by spring resilience.

Figure 8:
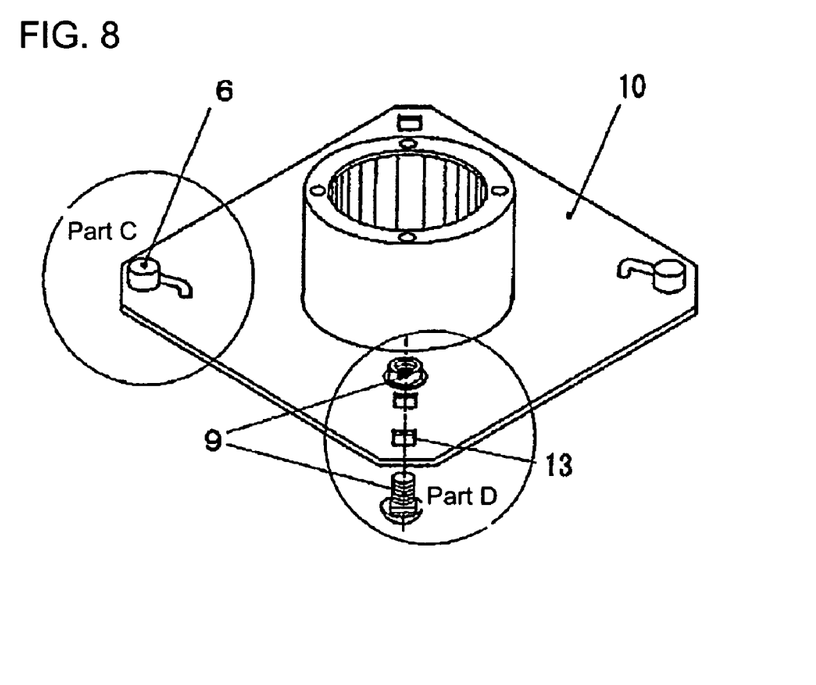
FIG. 8 is a perspective view showing a base plate of the bush cutter blade according to the embodiment of the present invention.
Figure 11:
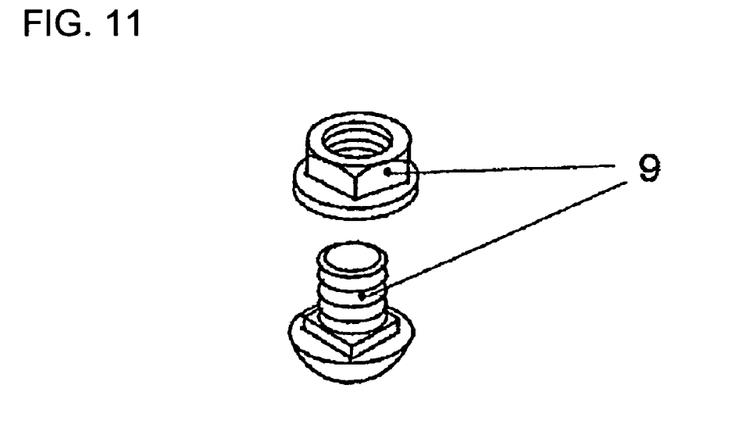
FIG. 11 is an enlarged perspective view of a bolt and nut in Part D in FIG. 8.

As shown in FIGS. 8 and 11, a bolt and nut 9 are used to attach the metal blade 8 to the base plate 10. The bolt is a cup head square neck bolt whose neck fits in a square hole 13 in the base plate 10 so that the nut can be tightened using a single wrench. Also, the nut is a lock nut.

Figure 13:
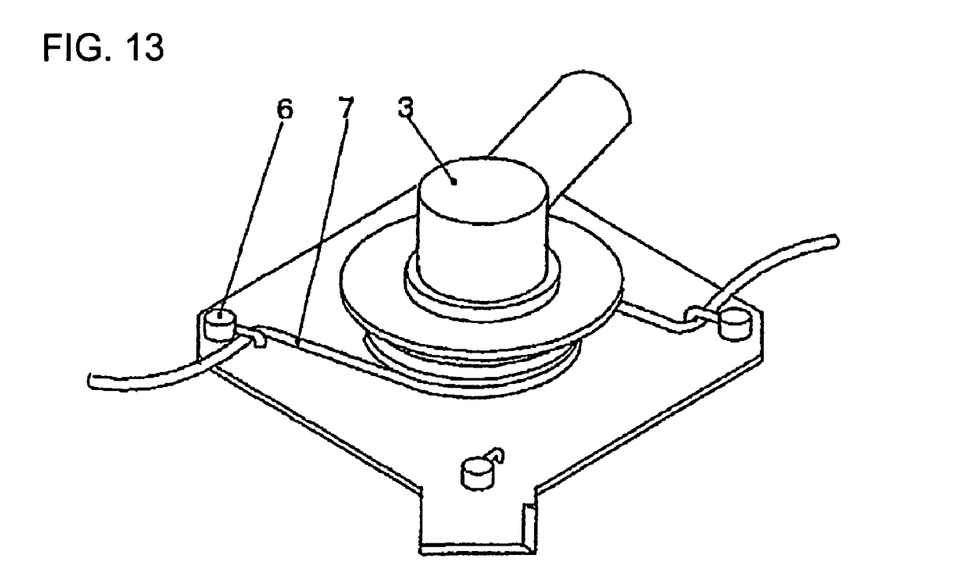
FIG. 13 is a perspective view showing another example of the base plate integrally including the bush cutter blades according to another embodiment of the present invention.

(b) A second example in which the reel 2 does not rotate is configured as shown in FIG. 13 except that the metal blade 8 is replaceable as in FIG. 1.

(c) A third example has the configuration shown in FIG. 1 except that the metal blade 8 is fixed as in FIG. 13.

Figure 14:
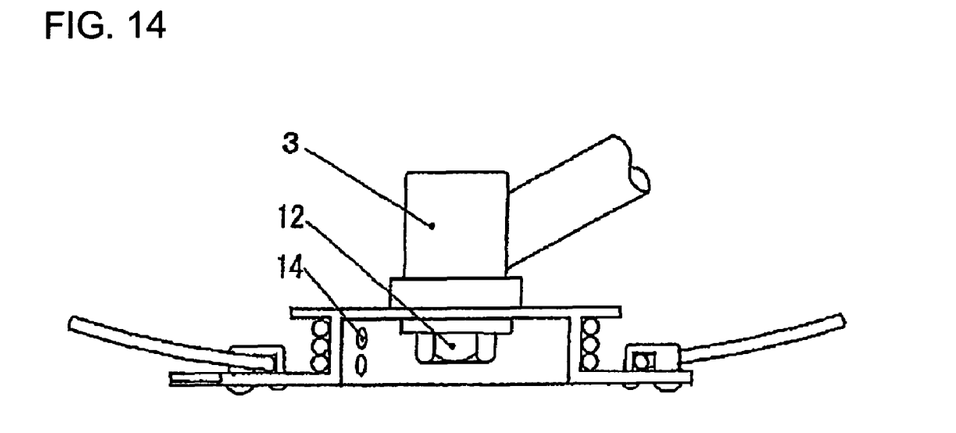
FIG. 14 is a plan view, partially including a cross section, showing another example of the bush cutter blade according to another embodiment of the present invention.

(d) A fourth example is a simplified type which can be produced at the lowest costs. As shown in FIGS. 13 and 14, the reel 2 does not rotate and the metal blade 8 is irreplaceable. When the resin string blade 7 is worn and torn, it is necessary to take the string out of the string guides 6 and reinsert the string in other string guides 6 by pulling out the string.

Actually, it is necessary to install four string guides 6, and when the string is placed in the string guide near the metal blade, the string could be cut by the metal blade if a grass cutting operation is carried out in a rough manner However, even this configuration can reduce work time greatly compared to conventional configurations. When the reel 2 is fixed, the resin string may be wound starting from hook-substitute holes 14 by inserting the resin string in the hook-substitute holes 14 from inside.

(e) In a fifth example, the bush cutter head 3 is mounted in the reel 2 as shown in FIG. 15. Although FIG. 15 shows an application to fourth example, this configuration is applicable to all the types described above. This configuration features a compact overall design and high safety, but cannot be used for bush cutters with a large head.

Figure 12:
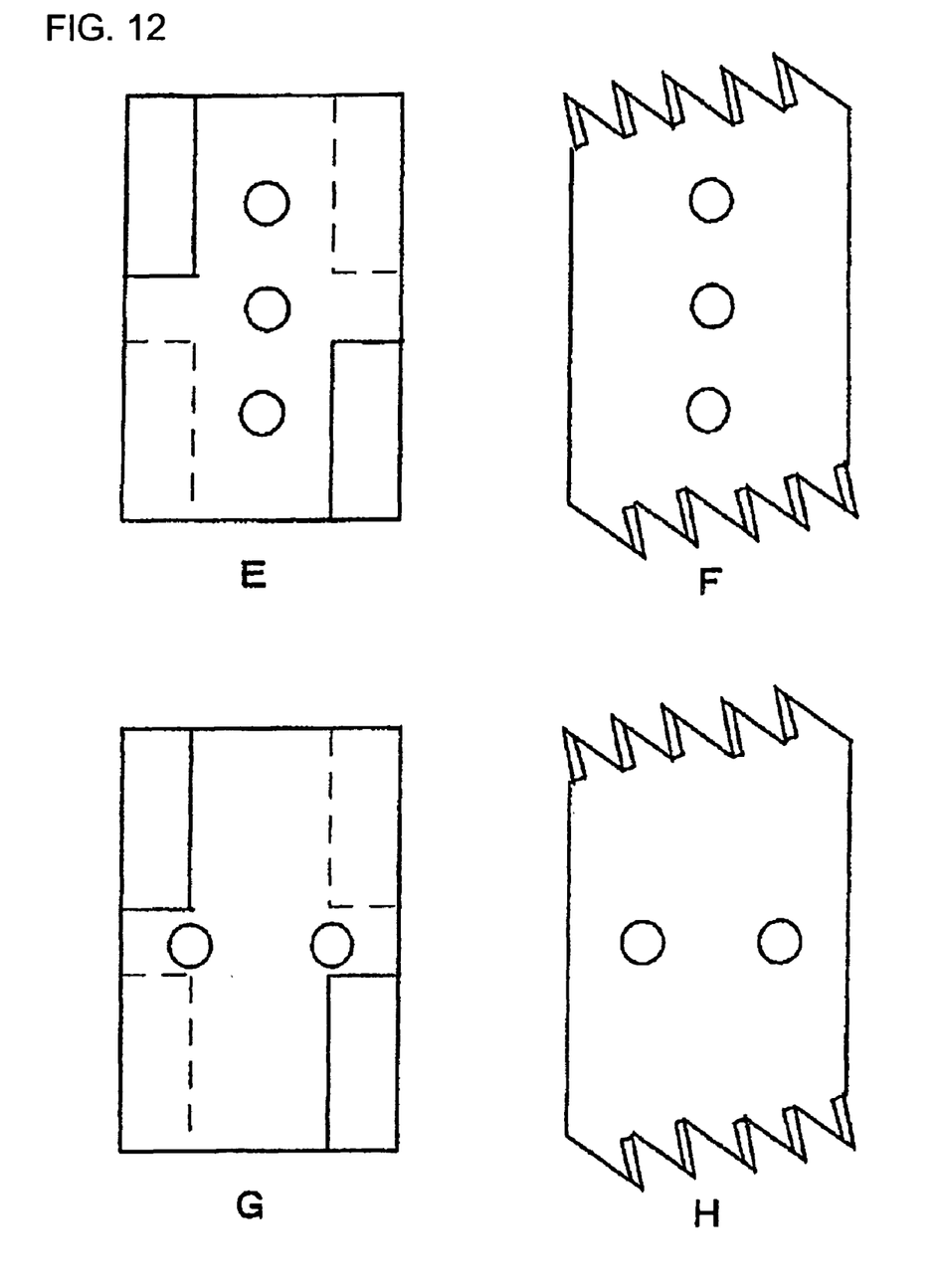
FIG. 12 is a plan view showing different types of metal blade used for the bush cutter blade according to the embodiment of the present invention.

(f) FIG. 12 shows types of spare blade used as bush cutter blades. Type E is resharpenable and has four cutting edges. Type F is a tip saw blade which cuts well, but is not resharpenable. Types G and H have the same blade geometries as types E and F, respectively, but differ from types E and F in mounting holes.

Conventional grass cutting operations often handle a mixture of hard and soft grasses, which makes it necessary to replace the cutting blade each time the environment changes or prepare another bush cutter. However, it is quite bothersome to prepare a bush cutter with another grass cutting blade. Thus, actually one grass cutting blade is used throughout the grass cutting operation by patiently assessing the situation.

Since a metal blade can cut most grasses anyway, in a grassy place likely to contain obstacles or near fences, it is common practice to cut grass at a low speed using a metal blade which will not be missed if broken.

In using the bush cutter blade according to the present invention, if the resin string blade 7 is extended approximately 10 cm from the metal blade, grass can be cut by taking advantage of properties of the resin string blade 7. When the grass is too hard to cut in this way, if the bush cutter is simply swung hard, the metal blade will come out from inside, allowing the hard grass to be cut with the metal blade without interrupting the operation.

At a grass cutting site covered with a lot of hard grass, if the protruding length of the resin string blade is set conservatively, properties of the metal blade are exhibited prominently, making it possible to cut the grass efficiently. Moreover, since properties of the resin string blade are preserved, this setup is also effective in cutting grass near fences or the like.

At a site covered with soft grass, if the string is boldly set longer than usual, the diameter of the blade becomes larger, allowing the string to cut grass far more efficiently than the metal blade.

That is, since the protruding length of the string can be set freely, characteristics of the grass cutting blades can be finely adjusted, allowing the operation to be carried out efficiently at reduced risk.

An operation can be carried out without stopping the engine, for example, when cutting grass around a concrete block wall, around garden stones or on a gravel walk, around standing trees or fruit trees, in bushes where it is not known what is left abandoned inside, or on a footpath between rice fields; when pruning a hedge; when removing weeds in a farm field; or when trimming a lawn. An almost continuous operation can be carried out by simply drawing out the worn resin string blade with a single touch without stopping the engine or replacing the cutting blades. Moreover, grass clippings are reduced to chips, providing a clean look without the need for cleaning.

As special uses, with the resin string set a little longer, the bush cutter can be used at a low engine speed to remove old bark from a fruit tree, crush the eggs of insect pests, or blow off trash. The resin string serves as a sharp cutting blade when used at a high engine speed, and even as a broom when used at a low engine speed. As a result, the combination of the two types of grass cutting blade has the following features.

(1) The metal blade lasts longer. Metal blades become blunt mainly when they are nicked by hitting something hard such as a stone rather than from long use. When it is likely that some foreign matter is hidden in the grass, the resin string blade can be used first for preliminary cutting to reveal and check the hidden part. Thus, the combination blade decreases the probability of unexpectedly hitting the metal blade against a hidden hard object or breaking a glass bottle, provides high safety, and maintains the sharpness of the metal blade for a long time. Moreover, since the metal blade can be replaced by changing the minimum part necessary, the combination blade ensures low running costs and allows the metal blade to be replaced with a type suitable for the intended use. Furthermore, when turned over and/or turned around 180 degrees, the metal blade can be used two or four times longer even if the blade edges are not resharpened, which is convenient in locations where the metal blade cannot be resharpened because a grinder or the like is not ready at hand.

(2) The resin string blade does not wear easily. The string wears extremely fast when hard grass or stems or small branches are cut forcibly. To deal with this, the rotational speed of the blades or protruding length of the resin string can be adjusted as appropriate to cut the hard grass or the like with the metal blade. This makes it possible to avoid hitting the resin string blade uselessly against the hard grass or the like and thereby avoid causing wear and tear on the resin string blade. Consequently, the life of the resin string blade is far longer than when grass is cut with the resin string blade alone. In short, the combination blade is structured such that the two blades compensate for each other's weaknesses.

(3) Other advantages include fast work, high safety, low maintenance costs, ability to prevent the blades from damaging each other, ability to reduce trash, ability to produce neat, clean cuts, and applicability to operations other than grass cutting.

The invention claimed is:

1. A bush cutter blade comprising:
a base plate;
a reel installed on the base plate;
a resin string blade wound around the reel;
string guides which detachably secure the resin string blade to the base plate; and
metal blades installed in such a way as to protrude outward from the base plate,
wherein a pair of the metal blades are installed on the base plate, being placed diagonally across the reel,
the string guides are installed on peripheral edges of the base plate at 90-degree angles to the metal blades;
each string guide has an opening through which the associated resin string blade passes and an arc-shaped portion which is contacted by and redirects the resin string blade when it passes through the opening;
the opening and the arc-shaped portion redirect constantly the resin string blade to extend outwardly at less than a 90 degree angle from a line extending substantially tangentially from the reel and in such a way as to protrude further outward than an outermost periphery of the metal blade.

2. The bush cutter blade according to claim 1, wherein the string guides are installed diagonally across the reel from each other, and a hook is installed on a side wall surface of the reel which secures the resin string blade to the reel, the resin string blade has a predetermined length and is folded into two halves which are wound around the reel starting from the hook with the folded resin string blade hitched to the hook, and terminal portions of the two strings of the resin string blade are fixed by being drawn out of the base plate in such a way as to face opposite directions.

3. The bush cutter blade according to claim 1, wherein the reel is installed rotatably with respect to the base plate and a mechanism is provided to lock the rotation of the reel with respect to the base plate.

4. The bush cutter blade according to claim 1, wherein the reel is formed integrally with the base plate.

5. The bush cutter blade according to claim 1, wherein the metal blades are mounted replaceably on the base plate.

6. The bush cutter blade according to claim 1, wherein the metal blades are installed integrally with the base plate.

7. A bush cutter equipped with the bush cutter blade according to claim 1.

8. The bush cutter blade according to claim 2, wherein the reel is installed rotatably with respect to the base plate and a mechanism is provided to lock the rotation of the reel with respect to the base plate.

9. The bush cutter blade according to claim 2, wherein the reel is formed integrally with the base plate.

10. The bush cutter blade according to claim 2, wherein the metal blades are mounted replaceably on the base plate.

11. The bush cutter blade according to claim 2, wherein the metal blades are installed integrally with the base plate.

12. A bush cutter equipped with the bush cutter blade according to claim 2.

13. The bush cutter blade according to claim 1, wherein the base plate includes a substantially planar portion to which the string guides and metal blades are fixed, and the reel, the resin string blade, and the string guides extend above an upper surface of the substantially planar portion.

14. The bush cutter blade according to claim 1, wherein the resin string blade as wound on the reel is uncovered and exposed outwardly during operation of the bush cutter blade.

15. The bush cutter blade according to claim 3, wherein the lock mechanism includes a lock lever which normally locks the rotation of the reel relative to the base plate, but which is configured to be manually manipulated to an unlocked position in which the reel can be rotated relative to the base plate for adjusting a projecting length of the string blade.

16. The bush cutter blade according to claim 1, wherein a surface of the arc shaped portion defines part of the opening.

17. The bush cutter blade according to claim 1, wherein the string guides redirect the resin string blades toward a rotation direction of the bush cutter blade.

18. The bush cutter blade according to claim 1, wherein the base plate has a central opening defined therein which is configured to be secured to a mounting shaft for rotating the bush cutter blade.

* * * * *